United States Patent [19]

MacDonald et al.

[11] 4,024,311

[45] May 17, 1977

[54] ELECTROCONDUCTIVE PAPER COATING

[75] Inventors: Donald M. MacDonald, Monroe; Lee H. Deed, Nyack, both of N.Y.

[73] Assignee: International Paper Company, New York, N.Y.

[22] Filed: Oct. 30, 1975

[21] Appl. No.: 627,261

[52] U.S. Cl. ................................ 428/342; 428/211; 428/413; 428/448; 428/476; 428/511; 428/514; 428/535; 428/537; 427/121; 252/500; 260/567.6 M

[51] Int. Cl.² .................... B32B 27/10; B32B 27/38

[58] Field of Search .......... 428/413, 476, 537, 448, 428/511, 514, 535, 342, 211; 427/121; 260/567.6 M; 162/138; 252/500

[56] References Cited

UNITED STATES PATENTS

| | | | |
|---|---|---|---|
| 3,011,918 | 12/1961 | Silvernail | 427/121 |
| 3,293,115 | 12/1966 | Lucker | 162/184 |
| 3,320,317 | 5/1967 | Rogers | 260/567.6 |
| 3,428,680 | 2/1969 | Walker | 260/567.6 |
| 3,625,684 | 12/1971 | Poot | 96/1.5 |
| 3,640,766 | 2/1972 | Jursich | 96/1.5 |
| 3,642,663 | 2/1972 | Greer | 252/500 |
| 3,798,032 | 3/1974 | Miller | 96/1.8 |
| 3,900,319 | 8/1975 | Miller | 96/1.8 |

OTHER PUBLICATIONS

Burness, J. Organic Chem., "Anomalous Reaction . . . with Trimethylamine," 29 (7) (1964) pp. 1862–1864.
McKelvey et al., *I & E Chemistry*, Product Research & Development, vol. 6, No. 2, pp. 115–120 (1967).

*Primary Examiner*—Michael F. Esposito

[57] ABSTRACT

Reaction products between monomeric epichlorohydrin and a tertiary amine when applied to the surface of a substrate, such as paper, produce an electroconductive surface useful in electrographic image reproduction. Both a coated paper product and a process of producing it are provided.

16 Claims, No Drawings

ELECTROCONDUCTIVE PAPER COATING

BACKGROUND OF THE INVENTION

This invention relates to the manufacture of substrates, such as paper, having an electroconductive coating useful when the paper is employed as a recording element in electrographic printing or image reproducing processes. More particularly it relates to a substrate having on at least a portion of its surface the reaction products from the interaction between monomeric epichlorohydrin and a tertiary amine as the electroconductive component in the coating and to the process for producing coated substrate product.

It is a requirement in many electrographic processes that the sheet or substrate receiving the image have a surface which will accept an electrostatic charge and hold it for a few minutes in darkness. Exposure to light makes the illuminated areas electroconductive and causes dissipation of the charge from the exposed surface. If an image to be reproduced is projected by light onto the surface of the sheet, the charge dissipates from the bright parts of the image but is retained in the dark parts. Suitable toners are attracted electrostatically to the charged regions and fixed, either by heat, solvent evaporation or other means to give a permanent reproduction of the image.

Imparting electrical conductivity to paper is not difficult provided that the paper is used at relatively high humidities, say 50% or more. Simple, water soluble inorganic salts which have a degree of hygroscopicity suffice. Such salts, including ammonium chloride, calcium chloride, etc., were widely used in the past. However, at very high humidities the paper containing these salts tends to become damp and curl up and exhibit all of the aesthetically objectionable properties of wet paper. On the other hand, at low humidities, the paper tends to dry out and conductivity is impaired. The result is a poor reproduction wherein toner is attracted to the whole sheet surface to a greater or lesser extent rather than just to areas which had not been illuminated.

It has become conventional more recently to employ polymers containing pendant ionic groups, such as trimethylammonium, sulfonium, phosphonium, carboxylate, and so on, all in the form of their salts with simple counterions such as chloride, sodium, potassium or ammonium to give improved performance in the low humidity regions. The improved performance is sufficient that such polymers have largely displaced the simple salts as electroconductive paper components.

Illustrative of coated paper products employing polymers containing pendant ionic groups are Silvernail et al. U.S. Pat. No. 3,011,918 employing polymerized vinylbenzyl quaternary ammonium compounds as the paper coating. Poot et al. U.S. Pat. No. 3,625,684 and Jursich et al. U.S. Pat. No. 3,640,766 employ polyepichlorohydrins quaternized by reaction with a tertiary amine, such as trimethylamine.

The quaternized polymers of the foregoing types are difficult to produce and, consequently, expensive. A monomer must be polymerized in a controlled manner to give a water soluble product of viscosity suitable for use in a coating mixture. Such control is, at times, difficult. The polymer must then be subjected to a suitable chemical reaction wherein there is attached an amino, sulfonium, phosphonium, carboxylic group, etc., to the polymer. Quite often the steps are reversed; that is, the pendant group is attached first and the intermediate is then polymerized. This procedure is just as difficult.

The quaternary ammonium group is now the preferred pendant group of those experienced in the art. Apparently, this is because of superior conductivity (M. F. Hoover and H. E. Carr, TAPPI, 51, 552–559, 1968). One such polymer is quaternized polyepichlorohydrin of said U.S. Pat. Nos. 3,640,766 and 3,625,684. Epichlorohydrin must first be polymerized using the highly pyrophoric and dangerous triisobutyl aluminum as catalyst. Such a method is described in U.S. Pat. No. 3,640,766. As triisobutyl aluminum is extremely reactive to water, traces of water must first be removed by distillation from the epichlorohydrin. Polymerization requires temperatures of around 100° C. After polymerization is complete, excess monomer is removed by steam distillation and the polyepichlorhydrin is quaternized by treatment with trimethylamine. Quaternization is a long, slow reaction requiring considerable expenditure of energy for heating. Times as long as 16 or 17 hours at 100° C. are mentioned in the patent.

Similar objections to a greater or lesser extent apply to the preparation of other polymers with pendant trimethylammonium groups.

In contrast to this, products and processes of the present invention involve reaction temperatures not higher than 100° C., for times as short as a minute or two, aqueous amine solution is used and so the monomeric epichlorohydrin need not be freed of traces of moisture, and a single reaction step, without subsequent distillation or other purification steps, is employed. In common with the quaternized polyepichlorohydrins, we, too, find it desirable to remove traces of amine by neutralization with hydrochloric acid or by quaternization with methyl chloride. This is desirable to remove objectionable amine odor from the product.

It is, accordingly, an object of the present invention to provide a novel electroconductive surface applied to a substrate, such as paper, suitable for electrographic image reproduction.

It is also an object of the present invention to provide a novel process for producing an electroconductive surface on a paper substrate which process eliminates the disadvantages of prior art processes for producing such products.

Other objects will be apparent to those skilled in the art from the present description.

GENERAL DESCRIPTION OF THE INVENTION

The product of the invention is a substrate, such as paper, etc., having applied to at least a portion of a surface thereof to impart electroconductive properties, an electroconductive coating, comprising the reaction products between monomeric epichlorohydrin and a tertiary amine at a temperature of at least about 70° C. The tertiary amine is employed in a ratio from 1 to 2 moles per mole of epichlorohydrin. Preferably, the ratio is from 1.1 to 1.2 moles per mole of epichlorohydrin and, most desirably, about 1.13 to 1. The tertiary amine should desirably have a pKb of between about 2.5 and 9.

Desirably, the coating is applied in conjunction with a film-forming polymer in a formulation containing also the reaction products of epichlorohydrin and the tertiary amine. Any film-forming product may be employed such as polyvinyl alcohol, polyvinyl acetate, ethylated starch, enzyme converted starch, styrene-butadiene, sodium silicate, acrylic copolymer or latex, vinyl ethylene copolymer, or protein, etc. Also, the film-forming material may be applied as a precoat, although preferably it is employed as both a precoat and in a formulation in admixture with said reaction product of epichlorohydrin and tertiary amine.

Reaction products of epichlorohydrin and tertiary amine are desirably applied to paper in amounts of at least about 0.05 pounds per 1,000 square feet of surface. Amounts of up to about 0.5 pounds per 1,000 square feet have been employed satisfactorily, but no advantage results from employing amounts in excess and economic reasons militate against the use of higher amounts. Preferably, the amount of reaction products applied to the paper is between about 0.1 and 0.25 pounds per 1,000 square feet of paper surface. It should be realized that the amounts employed may depend substantially upon the character of the paper and the sizing material employed in its production.

In the process of the invention, one mole of epichlorohydrin is placed in a suitable reaction vessel, equipped with a stirrer and means for heating and cooling. The vessel should, in the case of gaseous tertiary amines, be capable of withstanding moderate pressures. Because water is present, such pressures are low. Even with trimethylamine, which is the most volatile tertiary amine, pressures higher than 35 pounds per square inch are unlikely to be encountered. The epichlorohydrin is heated to about 80° C. and an aqueous solution containing one to two moles of tertiary amine for each mole of epichlorohydrin is added at a rate not exceeding the rate of heat removal from the reactor. Alternatively, the water and epichlorohydrin may both be placed in the reaction vessel and the tertiary amine may be added in pure form. Except for small laboratory reactions on a scale of less than one or two gallons, heat need not be supplied. The reaction heat has been found to be 31.9 kilogram calories per mole of epichlorohydrin, in the case of 1 mole of trimethylamine, and this heat is more than sufficient to hold the temperature at 80° C. When all of the amine is added, the temperature is maintained at 80° C. for 30 minutes to ensure reaction completeness. The reaction mixture is then cooled to ambient temperature and neutralized to pH 4 to 7.5 with concentrated hydrochloric acid. If methyl chloride is used in neutralization, gaseous methyl chloride is admitted about 15 minutes after the end of the amine reaction. In this case, it is necessary to hold the reaction at 80°–90° C. until the uptake of methyl chloride gas almost stops and the reaction mixture pH drops to 4 to 7.5. The time required will be dependent on the pressure of the methyl chloride gas. About 5 hours will be necessary at 30 p.s.i. pressure due to methyl chloride gas while, at 60 p.s.i., about 1.5 hours is needed. If the amount of water has been correctly chosen, the resulting solution of reaction product can be used in a coating formulation without further processing.

From the standpoint of cost, availability in large tonnage lots, and product performance, trimethylamine is the preferred amine. Other tertiary amines, such as the alkyl amines, triethyl, triisopropyl, methyldiethylamine, N-dimethyl cyclohexyl, and N,N-tetramethyl ethylene diamine; alkanol-amines such as triethanolamine, and the aromatic and heterocyclic amines, such as N-dimethylaniline and pyridine have been successfully employed. The reaction appears to be general in scope; however, the conductivity of the product falls off somewhat with the higher amines. Therefore, the lower molecular weight amines, especially trimethylamine, are preferred.

The time of reaction is, in practical terms, governed only by the rate of heat removal in the case of trimethylamine. In this case, small scale batch operations may require 90 to 120 minutes. Longer times have been used on a pilot plant scale. However, excessively long times, in the order of 10 hours or more, are undesirable since they may cause excessive color. Very small batches have been run with trimethylamine addition times as low as four minutes. The desired product was obtained. While there is no apparent reason why this period could not be lowered still further, a limit does exist. For the first 10–30 seconds of amine addition in these experiments, the reaction mixture temperature dropped rapidly. After the induction time was over, the temperature rose rapidly and addition rate had to be controlled to prevent overheating.

Other amines require other reaction times, depending on the reaction velocity.

Generally speaking, tertiary amines having a pKb of 2.5 to 9 and which are at least partially soluble in 80° C. water react rapidly unless a bulky substituent group hinders the interaction between epichlorohydrin and the unshared electrons of the tertiary amine. The poor reactivity of triethanolamine is due to this phenomenon which is known as steric hindrance to those skilled in organic chemistry. Tri-n-propylamine also reacts slowly but here, poor water solubility is a factor accompanying steric hindrance. Poor reactivity in absence of steric hindrance is shown by dimethylaniline. Dimethylaniline is reported to be only slightly soluble in water (*Handbook of Chemistry and Physics*, 54th Edition, CRC Press, page C-109).

Poor reactivity is undesirable because the reaction does not go to completion within reasonable time. Thus, in spite of the use of 100° C. reaction temperature in place of the preferred 80° C., unreacted triethanolamine, dimethylaniline and tri-n-propylamine, along with unreacted epichlorohydrin, were present in their respective reacted mixtures and, because of an anticipated odor problem in the coated paper, had to be removed by extraction prior to formulation into coatings. While reaction velocity can undoubtedly be increased by use of wetting agents and high-shear mixing where water solubility is a problem, this would lead to undesirable additional energy requirements and the wetting agent would act as an undesirable impurity. Extraction would involve an additional processing step, and the even more objectionable necessity of purifying the extract prior to reuse. For these various reasons and others apparent to those skilled in the art, such as toxicity for dimethylaniline, we prefer to use simple, water soluble, tertiary amines. These would have the formula $RR_1R_2N$, wherein $R,R_1$ and $R_2$ are all methyl, ethyl, or isopropyl or diamines of the formula $RR_1N(CH_2)_xNRR_1$ or triamines of the formula $RR_1N(CH_2)_xNR(CH_2)_yNRR_1$ or higher non-polymeric homologues. Here one should note that complete solubility is not necessary. N-dimethyl cyclohexylamine and triethylamine both reacted quickly and smoothly.

The reaction temperature must be at least 70° C. At temperatures below 70° C., an initial reaction will occur which will not consume all of the epichlorohydrin unless two moles of amine are present. At 70° C. a second reaction occurs wherein one mole of amine will solubilize one mole of epichlorohydrin. We prefer to employ temperatures of about 80° C as reaction at this temperature is smooth and rapid without excessive color formation. At temperatures above 90° C., unacceptable color has been encountered for many amines, including the preferred amine, trimethylamine. Triethanolamine is an exception as, probably because of its low reactivity, color formation is not rapid even at 100° C.

Color increases with time, and temperatures of 100° C., or even higher, with acceptable color in the product, can be tolerated in extremely fast reactions, say in five minutes or less. However, such fast reactions lead to the other control troubles herebefore mentioned. Acceptable color may be defined as no more than that of three on the Gardner scale.

The ratio of moles of epichlorohydrin to tertiary amine can be varied between 1:1 and 1:2. Above 2 moles of amine there will be excess amine in the product. This is objectionable on the grounds of cost and increased consumption of hydrochloric acid or methyl chloride to neutralize. At less than one mole of amine for one mole of epichlorohydrin, excess epichlorohydrin will be present in the product and this will have to be removed or the coated paper will have the objectionable, lachrymal odor of epichlorohydrin. For reasons not clear to us, the product pH after neutralization to pH 5 to 7 drifts alkaline with time if 1.00 to about 1.12 moles of amine are used for each mole of epichlorohydrin. As those experienced in the art are well aware, coating pH should be stable between formulation and application, and so we prefer to employ about 1.13 moles of amine for each mole of epichlorohydrin. Higher levels of amine, up to 2.00 moles, are not objectionable except for a slight impairment of conductivity of the coated paper and increased requirement of chemicals to bring the pH of the final product to 5 to 7. This pH is preferred simply on the grounds of ease of formulation of the coating mixture. The product can be stored and used without neutralization, although some darkening in color may result.

Methyl chloride is slightly preferred over hydrochloric acid for removal of traces of unreacted trimethylamine or the amine in the product. However, the objectionable odor of trimethylamine associated with the use of hydrochloric acid can be masked by use of small amounts of materials of pleasing and lasting odor in the coating formulation.

Chloride is the anion of preference, for reasons discussed by Hoover and Carr in the TAPPI article referred to above. However, other anions, such as the halides, bromide or iodide, are not excluded.

The reaction products of epichlorohydrin with tertiary amine are extremely hydroscopic and are not themselves film-forming. All chlorine is present in the ionic form and is equivalent on a mole for mole basis with nitrogen. On prolonged drying at 110° C., brittle amorphous solids form which very quickly soften and return to a mobile liquid state when cooled in presence of atmospheric moisture. A crystalline product is obtained from the two mole trimethylamine-one mole epichlorohydrin reaction which proceeds as efficiently at room temperature as at 80° C. This is probably the bis salt of formula No. I, 2-hydroxypropane-1, 3-bis (trimethylammonium chloride) first reported by Schmidt and Hartmann (Annalen 337, 116,1904) as was mentioned by Burness (J. Organic Chem., 29, 1862-1864, 1964), produced in accordance with the following reaction:

$$2\ (CH_3)_3N + \underset{\diagdown\ O\ \diagup}{CH_2CHCH_2Cl} \longrightarrow$$

$$Cl(CH_3)_3NCH_2CHOHCH_2N(CH_3)_3Cl \qquad I$$

The compound of formula No. I is not as hydroscopic as the products containing 1.14 moles of amine and this would cause the lower conductivity at 20% relative humidity.

The chemical composition of the reaction products varies with mole ratios of tertiary amine to epichlorohydrin. While we believe we have correctly ascertained the identity of the product obtained at a 2 to 1 mole ratio, we have been unable to identify the composition of the products obtained at other ratios.

The 1.13 mole product of the epichlorohydrin-trimethylamine reaction is a complex mixture of a quaternized nitrogen compound which we have been unable to separate intc individual components for analysis. The epoxy group is not present in the product although about 4% of the product is the ring-opened material of the formula, $HOCH_2CHOHCH_2N(CH_3)_3Cl$, as was shown by titration with periodic acid. The compound of formula I has been isolated in about 10% yield indicating that trimethylamine in excess of 1 mole/mole of epichlorohydrin has been consumed into its formation. Evidence for unsaturation in the nuclear magnetic resonance spectrum indicates small amounts of N-(3-hydroxy-1-propenyl)trimethylammonium chloride ($CH_2OHCH_2 = CHN(CH_3)_3Cl$) are also present. This compound was described by Burness in the J. Organic Chem. article referred to above.

In formulating a coating for paper or other substrate from the reaction products of the present invention, it is essential that a compatible film-forming binder material be present in the precoat in sufficient quantity to form a continuous matrix on which the reaction product of the invention will be uniformly distributed. Fortunately, the acrylic, polyvinyl acetate, or styrene-butadiene latices widely used in electroconductive coating formulations are effective for this purpose. Sodium silicate, an inorganic film-forming binder, as well as vinyl-ethylene copolymer, protein, polyvinyl alcohol, ethylated starches, and enzyme converted starches, are also effective. Alternatively, polymeric electroconductive resins, such as quaternized polyepichlorohydrin and polyvinylbenzyl trimethylammonium chloride, can, because of their polymeric, film-forming nature, also be used with the reaction products of the invention to provide a continuous, compatible matrix in the topcoat. Choice between these alternatives is not based on conductivity, but on such factors as resistance to toner solvent, influence on paper stiffness, and total cost of the coating.

In preparing paper coatings, in accordance with one embodiment of the invention, there is first laid down on the paper a film-forming binder precoat in which the polymer may constitute 100% by weight of the coating, with a minimum of 20% by weight of the precoating. The remainder of the precoat is finely-divided filler, such as clay, calcium carbonate, etc. Over the film-forming binder precoat there is placed the conductive coating comprising film-forming binder and reaction products of epichlorohydrin and tertiary amine. In the conductive coating, the film-forming binder may desirably comprise from about 10% to 60% by weight of the coating with the reaction product also comprising between about 10% and 60% by weight of the coating and any remainder being finely-divided filler, such as clay, calcium carbonate, etc. It is desirable to employ film-forming binders in the conductive coating in order to reduce the highly hygroscopic properties of the reaction products of epichlorohydrin and tertiary amine, as well as to provide for a continuous matrix within which the reaction product will be continuously distributed.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

611 g. (grams) of epichlorohydrin were sealed in a one-gallon, closed reactor equipped with a cooling coil, stirrer, thermometer well and a liquid inlet port. After heating to 75° C., addition of 2020 g. of a 22.0% aqueous trimethylamine solution was carried out during 120 minutes. Water was circulated in the coils as required to maintain an 80°–83° C. reaction temperature. The glass reactor bowl was partially immersed in 80° C. water throughout the run. After addition was complete, the temperature was maintained at 80° C. for 30 minutes, after which the aqueous product solution was cooled to room temperature and adjusted to pH 6.1 with 87.4 mls. of concentrated hydrochloric acid.

This example, wherein 1.13 moles of trimethylamine is permitted to react with each mole of epichlorohydrin, is the preferred procedure for preparation of the electroconductive coating composition of the present invention.

EXAMPLE II 611 g. of epichlorohydrin were treated with 1591 g. of 27.9% trimethylamine following the procedure outlined in Example I. Addition of trimethylamine required 93.5 minutes. 15 minutes after trimethylamine addition was complete, the pressure on the reactor was relieved and methyl chloride gas was charged to 30 p.s.i. The reactor was kept at 80°–85° C. with continuous stirring and the pressure readjusted to 30–35 p.s.i. with methyl chloride gas each time the pressure dropped to 20 p.s.i. This cycling was continued until the uptake of methyl chloride gas had almost stopped and the pH had dropped from above 12 to 4.7. The product (2264 g.) contained 50.7% solids.

EXAMPLE III 92.5 g. of epichlorohydrin were heated to 88° C. in a 500 ml., 3-necked flask carrying a stirrer, condenser and dropping funnel and immersed in a hot water bath. 286.8 g. of a 25.95% aqueous trimethylamine solution were added as quickly as possible. To do this a few grams (unmeasured) of the amine solution were added and the dropping funnel stopcock turned off. The temperature of the epichlorohydrin dropped abruptly to about 75° C. and after about 20 seconds rose rapidly. When the temperature started to rise, the hot water bath was replaced with an ice bath and, simultaneously, the trimethylamine addition was restarted. Four minutes, 11 seconds were required to add all of the trimethylamine solution. The flask was immediately removed from ice and again placed in the hot water. The mixture was maintained at 80° C. for the usual half-hour, cooled and neutralized to pH 6.4 with 11.3 mls. concentrated hydrochloric acid. In this run, 26.8 g. of extra trimethylamine solution were used to compensate for trimethylamine lost through the condenser.

The product was identical in color, index of refraction, elemental analysis, infrared spectrum and liquid chromatograph behavior to that produced in Example I.

EXAMPLE IV 3362 g. of a 25.56% aqueous trimethylamine solution in a 5 liter round-bottomed flask equipped with a stirrer, condenser and dropping funnel were treated with 611 g. of epichlorohydrin. Epichlorohydrin addition required 100 minutes during which time the temperature was not permitted to rise above 28° C. The product was neutralized with 631 mls. of concentrated hydrochloric acid.

EXAMPLE V 611 g. of epichlorohydrin and 1576 mls. water were heated to 80° C. in a 5 liter, round-bottomed flask equipped with stirrer, condenser and a gas inlet tube. 444 g. trimethylamine gas were bubbled in through the inlet tube. Gas addition time was 135 minutes during which time the temperature was kept at or below 87° C. After the usual 30-minute period above 80° C., the reaction mixture was cooled and neutralized to pH 6.2 with 89 mls. of concentrated hydrochloric acid.

EXAMPLE VI 200 g. of methyldiethylamine were dissolved in 472.5 g. of water and added over a period of 70 minutes to 186.5 g. of epichlorohydrin at 80° C. The product was neutralized to pH 6.8 by addition of 4.4 ml. of concentrated hydrochloric acid.

EXAMPLE VII 1740 mls. water and 630 g. of epichlorohydrin in the 5-liter flask equipped with stirrer, thermometer, condenser and dropping funnel were treated with 723 g. triethylamine. Addition to the 80°–88° C. reacting mixture required 116 minutes. After the usual 30 minutes above 80° C., followed by cooling to 25° C., 53.8 ml. concentrated HCl were added to neutralize to pH 5.7.

EXAMPLE VIII

The procedure of Example VII was repeated using 1740 mls. water, 680 g. of epichlorohydrin and 640 g. pyridine. Addition of pyridine required 127 minutes. After removal of a two-inch thick layer of heavy foam on the surface of the black reaction mixture, 10.3 ml. concentrated HCl were required to neutralize to pH 6.0.

EXAMPLE IX 1740 mls. of water and 484 g. of epichlorohydrin in the Example VII apparatus were heated to 90° C. and treated with 853 g. of triethanolamine. As reaction seemed sluggish, the temperature was allowed to reach 100° C. during the addition which required 62 minutes.

As the epichlorohydrin water mixture was refluxing 25 minutes after triethanolamine addition was complete, the reaction mixture was kept at 100° C. for 1 hour after the end of triethanolamine addition. 70 ml. of concentrated hydrochloric acid were required to neutralize to pH 6.5.

The product (43.1% solids) analyzed for 6.7% total chlorine but only 6.3% ionic chlorine. Because of this, it was extracted three times with benzene to remove residual epichlorohydrin. The extracted product (43.9% solids) contained 6.5% total chlorine and 6.4% ionic chlorine.

EXAMPLE X 1740 mls. water and 546 g. epichlorohydrin in Example VII apparatus were treated at reflux temperature with 775 g. of dimethylaniline. Addition required 68 minutes after which the reaction mixture was heated at reflux for three hours. The cloudy solution was cooled extracted with benzene to remove unreacted epichlorohydrin and dimethylaniline. 1.8 ml. concentrated hydrochloric acid were required to neutralize to pH 4.4.

EXAMPLE XI 1740 g. water, 495 g. epichlorohydrin and 840 g. tri-n-propylamine were stirred at 80°–90° C. for 1.5 hours and at reflux temperature (94°–97° C.) for an additional 7 hours. The mixture was cooled and 365 g. of unreacted tri-n-propylamine were removed by separating the top amine layer from the aqueous reaction mixture using a separatory funnel. Only 1.0 ml. of concentrated hydrochloric acid was needed for neutralization to pH 6.2.

EXAMPLE XII

The procedure of Example VII was followed using 1740 mls. water, 780 g. epichlorohydrin and 530 g. of N-tetramethylethylenediamine. Addition required 129 minutes. The product, which was almost black in color, was neutralized to pH 6.1 with 49.3 ml of concentrated hydrochloric acid.

EXAMPLE XIII

The procedure of Example VII was followed using 1740 mls. water, 531 g. of epichlorohydrin and 803 g. N,N-dimethylcyclohexylamine. 93 minutes were required for amine addition and 34.1 mls. concentrated hydrochloric acid for neutralization to pH 6.0.

EXAMPLE XIV

Products of the foregoing examples were coated on Mylar film to demonstrate inherent conductivity and coating continuity and on a standard bleached kraft paper which had received a sodium silicate precoat. 0.5 lbs. coating were applied to each side of each 1000 ft.$^2$ of paper or film. The coating formulation was, on a solids basis:

50% calcium carbonate;

30% acrylic latex;

20% electroconductive material of the examples.

The sheets were conditioned in a 20% humidity room after drying. The conductivity of the conditioned sheets was determined by a standard procedure substantially like that described in ASTM D257-46, Standard Method of Test for Insulation Resistance of Electrical Insulation Materials. Results are shown in Table I, below:

Table I

| Electroconductive Material, Prepared as in Example | Surface Resistivity in Ohms; 20% Relative Humidity; Mylar | Surface Resistivity in Ohms; 20% Relative Humidity; Paper |
|---|---|---|
| I | $3.3 \times 10^7$ | $3.1 \times 10^9$ |
| II | $7.3 \times 10^7$ | $1.4 \times 10^9$ |
| IV | $3.5 \times 10^{10}$ | $2.1 \times 10^{10}$ |
| VI | $2.0 \times 10^8$ | $4.9 \times 10^9$ |
| VII | $5.3 \times 10^8$ | $8.0 \times 10^9$ |
| VIII | $2.4 \times 10^8$ | $7.0 \times 10^{10}$ |
| IX | $8.9 \times 10^8$ | $9.7 \times 10^{10}$ |
| X | $3.1 \times 10^9$ | $6.5 \times 10^{10}$ |
| XI | $1.1 \times 10^9$ | $3.3 \times 10^{10}$ |
| XII | $4.5 \times 10^8$ | $8.7 \times 10^9$ |
| XIII | $7.1 \times 10^9$ | $6.3 \times 10^{10}$ |

EXAMPLE XV

The product of the present invention, prepared as described in Example I, was applied to papers containing three different precoats. Coating formulations and results were as follows:

| Precoat | | | | Conductive Coating | | | |
|---|---|---|---|---|---|---|---|
| Acrylic Latex | Ethylene-Vinyl Copolymer Latex | Partially Hydrolyzed Poly vinyl Alcohol | Clay | Acrylic Latex | Clay | Electro-Material | Surface Resistivity in Ohms; 20% Relative Humidity |
| 30 | 30 | 10 | 30 | 15 | 35 | 50 | $4.2 \times 10^7$ |
| 30 | 15 | 10 | 45 | 15 | 35 | 50 | $1.1 \times 10^8$ |
| 30 | 30 | 10 | 30 | 15 | 45 | 40 | $1.9 \times 10^8$ |

EXAMPLE XVI

Aqueous solutions containing varying amounts of solids of polyvinylbenzyl trimethylammonium chloride (abbreviated as "PVBT"), and for Example I product were mixed together, formulated into coatings and applied to a starch precoated paper using a hand draw-down technique. The coating formulation contained, on a solids basis, 55% of a mixture of clay and calcium carbonate, 20% synthetic binders (acrylic and styrene butadiene latices, 2% starch and 23% electroconductive component).

| Sample No. | Electroconductive Component, % by wt. of Coating Solids | Surface Resistivity in Ohms, 20% Relative Humidity |
|---|---|---|
| 1 | 23% PVBT | $1.6 \times 10^9$ |
| 2 | 20% PVBT<br>3% Example I | $1.7 \times 10^9$ |
| 3 | 17% PVBT<br>6% Example I | $2.5 \times 10^9$ |
| 4 | 11.5% PVBT<br>11.5% Example I | $4.8 \times 10^9$ |
| 5 | 6% PVBT<br>17% Example I | ;11 $5.3 \times 10^{10}$ |

EXAMPLE XVII

A paper product was prepared by first placing a precoat on the sheets of paper consisting of 100% enzyme-converted starch. Over the precoat was placed a conductive coating consisting of 50% by weight of the reaction product of epichlorohydrin and trimethylamine produced in accordance with Example I, 35% by weight of finely-divided clay and 15% of acrylic film-forming binder resin. The coatings were placed on both sides of the paper with the amount of coatings consisting of 0.68 pounds of coating for each 1000 square feet of paper surface. The surface resistivity of one side was $4.7 \times 10^{10}$ ohms and on the other side $7.3 \times 10^{10}$ ohms, at 20% relative humidity.

EXAMPLE XVIII

A paper product was prepared by first placing a precoat on sheets of paper consisting primarily of globular protein. Over the precoat was placed a conductive coating consisting of 30% by weight of the reaction product of epichlorohydrin and trimethylamine produced in accordance with Example I, 50% by weight of finely-divided calcium carbonate and 20% acrylic film-forming binder resin. The coating was placed on one side of the paper with the amount of coatings consisting of 0.329 pounds of coating for each 1,000 square feet of paper surface. The surface resistivity of the coated side was $4.5 \times 10^{10}$ ohms in a 20% relative humidity conditioned atmosphere.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An electroconductive product suitable for electrographic image reproduction comprising a substrate having on at least a portion of a surface thereof a coating comprising the reaction products of a tertiary amine and monomeric epichlorohydrin reacted in a mole ratio of 1 to 2:1 and at a temperature of at least about 70° C up to about 100° C.

2. An electroconductive product according to claim 1 wherein the tertiary amine has a pKb of between about 2.5 and 9.

3. An electroconductive product according to claim 1 wherein the tertiary amine is a trialkyl amine.

4. An electroconductive product according to claim 1 wherein the tertiary amine is trimethylamine.

5. An electroconductive product according to claim 1 wherein the tertiary amine is dimethylcyclohexylamine.

6. An electroconductive product according to claim 1 wherein the tertiary amine is N,N-tetramethylethylenediamine.

7. An electroconductive product according to claim 1 wherein the tertiary amine is pyridine.

8. An electroconductive product according to claim 1 wherein the reaction products are present in an amount of at least about 0.05 pounds per 1,000 square feet of substrate surface.

9. An electroconductive product according to claim 1 wherein the substrate is paper.

10. An electroconductive product according to claim 1 wherein the said reaction products are bound to said substrate by means of a film-forming polymer.

11. An electroconductive product according to claim 10 wherein the film-forming polymer is a member selected from the class consisting of sodium silicate, polyvinyl alcohol, ethylated starch, enzyme converted starch, styrene-butadiene, polyvinyl acetate, vinylethylene copolymer, and globular protein.

12. An electroconductive product according to claim 10 wherein the said film-forming polymer is present as a precoat.

13. An electroconductive product according to claim 10 wherein said film-forming polymer is an acrylic latex.

14. An electroconductive product according to claim 1 wherein said mole ratio is between about 1.1 and 1.2:1.

15. An electroconductive product according to claim 1 wherein said mole ratio is about 1.13:1.

16. An electroconductive product according to claim 1 wherein said reaction products are present in an amount of between about 0.05 and 0.5 pounds per 1,000 square feet of substrate surface.

* * * * *

UNITED STATES PATENT AND TRADEMARK OFFICE
CERTIFICATE OF CORRECTION

PATENT NO. : 4,024,311

DATED : May 17, 1977

INVENTOR(S) : Donald M. MacDonald and Lee H. Deed

It is certified that error appears in the above-identified patent and that said Letters Patent are hereby corrected as shown below:

Column 10, table of Example XVI, last line in third column, delete ";11 5.3 x $10^{10}$" and replace with -- 5.3 x $10^{10}$ --.

Signed and Sealed this

*ninth* Day of *August 1977*

[SEAL]

*Attest:*

RUTH C. MASON
*Attesting Officer*

C. MARSHALL DANN
*Commissioner of Patents and Trademarks*